United States Patent
Jung et al.

(10) Patent No.: US 9,193,343 B2
(45) Date of Patent: Nov. 24, 2015

(54) BRAKE CONTROL SYSTEM AND METHOD HAVING VARIABLE BRAKING MODES

(71) Applicant: Hyundai Motor Company, Seoul (KR)

(72) Inventors: Young Suk Jung, Daegu (KR); Jin Hwan Choi, Ansan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 161 days.

(21) Appl. No.: 13/972,554

(22) Filed: Aug. 21, 2013

(65) Prior Publication Data

US 2014/0136069 A1    May 15, 2014

(30) Foreign Application Priority Data

Nov. 13, 2012 (KR) .................. 10-2012-0127825

(51) Int. Cl.
  *B60T 8/17*   (2006.01)
  *B60T 13/66*  (2006.01)

(52) U.S. Cl.
  CPC ........... *B60T 13/662* (2013.01); *B60T 2220/02* (2013.01); *B60T 2220/06* (2013.01); *B60T 2270/82* (2013.01); *B60T 2270/86* (2013.01)

(58) Field of Classification Search
  CPC ........... B60T 8/17; B60T 8/1755; B60T 7/22; B60T 13/665; B60T 8/4081; B60T 8/3275
  USPC .............. 701/70; 180/272, 273, 287; 303/20, 303/113.4, 155, 191
  See application file for complete search history.

(56) References Cited

U.S. PATENT DOCUMENTS

| 6,070,682 A * | 6/2000 | Isogai et al. ............... 180/167 |
| 6,309,031 B1 | 10/2001 | Crombez et al. |
| 6,431,662 B2 * | 8/2002 | Isono et al. ............... 303/114.3 |
| 2001/0020800 A1 * | 9/2001 | Isono et al. ............... 303/113.1 |
| 2005/0004732 A1 * | 1/2005 | Berry et al. .................... 701/48 |
| 2007/0241874 A1 * | 10/2007 | Okpysh et al. ............... 340/479 |
| 2009/0179485 A1 * | 7/2009 | Yang ............................ 303/20 |
| 2010/0200342 A1 * | 8/2010 | Drott et al. .................... 188/152 |
| 2012/0074770 A1 | 3/2012 | Lee |

FOREIGN PATENT DOCUMENTS

| JP | 2003-146117 A | 5/2003 |
| JP | 2004-224261 A | 8/2004 |
| JP | 2006-306288 A | 11/2006 |
| KR | 10-0177624 | 11/1998 |
| KR | 10-2001-0076033 A | 8/2001 |

* cited by examiner

Primary Examiner — James Trammell
Assistant Examiner — Majdi Alsomiri
(74) Attorney, Agent, or Firm — McDermott Will & Emery LLP

(57) ABSTRACT

A brake control system and method having variable braking modes includes an operation part, a brake input detector, and a controller. The operation part is disposed to allow a driver to selectively input one of a plurality of predetermined braking characteristics modes. The brake input detector detects a brake pedal operation variance or a brake pedal manipulation force of the driver. The controller receives a mode selection signal from the operation part to recognize a braking characteristic mode selected by the driver, and then controls a wheel brake to generate a predetermined pattern of braking force in the braking characteristic mode selected by the driver based on the brake pedal operation variance and the brake pedal operation force detected by the brake input detector.

9 Claims, 4 Drawing Sheets

BRAKE CONTROL SYSTEM AND METHOD HAVING VARIABLE BRAKING MODES

CROSS-REFERENCE TO RELATED APPLICATION

This application claims under 35 U.S.C. §119(a) priority of and the benefit of Korean Patent Application No. 10-2012-0127825 filed Nov. 13, 2012, the entire contents of which are incorporated herein by reference.

TECHNICAL FIELD

The present disclosure relates to a brake control system and method for a vehicle, more particularly, to a brake control system and method for a vehicle, which can provide customized braking characteristics to drivers having different driving tendencies and can improve vehicle marketability.

BACKGROUND

Generally, a brake of a vehicle decelerates or stops the vehicle in operation, or maintains the vehicle at a standstill. When the brake operates, kinetic energy of the vehicle is converted into thermal energy by mechanical friction, and frictional heat is emitted therefrom to the atmosphere.

Vehicle brakes are divided into a drum-type hydraulic brake and a disc-type hydraulic brake. In a disc-type hydraulic brake, a braking force is generated when a disc is rotating together with a wheel instead of a drum, and the brake is strongly pressed by a frictional pad.

However, since hydraulic brakes require mechanical components, hydraulic pipes, and components for controlling a hydraulic pressure connected to a brake pedal of a driver's seat, their structure is complicated.

Accordingly, Electro-Mechanical Brakes (EMBs) have been recently used to simplify the structure of the braking apparatus.

Unlike typical hydraulic brakes, EMBs refer to brakes that obtain a braking force by pressing a frictional pad using a mechanism driven by an electric motor.

Common EMBs have an actuator including a motor that rotates for braking or braking release and applies pressure to the frictional pad using the torque of the motor to allow the disc to be pressurized or rubbed by friction. The EMBs receive a braking intention of a driver through the brake pedal, and then control a braking pressure of a wheel using the motor.

Since the EMBs, as the next-generation braking concepts, have quick response speed and enable precise control compared to the hydraulic brakes, the EMBs are expected to be preferentially applied to eco-friendly vehicles such as electric vehicles.

EMBs can also be achieved in combination with hydraulic brakes. For example, a hydraulic brake and an EMB can be applied to the front wheel and the rear wheel, respectively. Compared to a system adopting only a hydraulic brake, the combination system of the EMB and the hydraulic brake has a simple structure and an excellent braking force response with an easy control of the braking force.

Also, a Brake-By-Wire (BBW) system in which EMBs brakes are mounted in both front and rear wheels can be implemented. The BBW system performs braking by allowing electric calipers disposed at the front and rear wheels to hold the disc according to signals of a controller.

An Electro-Hydraulic Brake (EHB) system is another form of the BBW system and is different from the EMB. In the EHB system, a controller receives signals from a pedal travel sensor and a hydraulic sensor in a master cylinder to detect a driver's brake intention and requests deceleration and controls the hydraulic pressure of an accumulator through a solenoid valve to perform hydraulic braking on wheels.

Since the BBW system delivers a driver's braking intention using electric signals, there is no mechanical connection between the brake pedal and the wheel, and independent and precise control of the braking force on each wheel of a vehicle is possible. Furthermore, control of the braking force is easy, braking distance can be shortened, and braking stability can be increased.

The BBW system uses a pedal simulator to provide a hydraulic pedal-like feeling using hysteresis characteristics. The pedal simulator achieves the feeling of a pedal such as an existing hydraulic brake when a driver operates a pedal and assists the braking operation of a driver by forming a pedal repulsive force against the braking operation.

The BBW system is more advanced than typical braking apparatuses in which the characteristics of driver's pedal effort (force applied to the pedal) vs. braking force shows a single mode.

For example, when a driver steps on the brake pedal by force A1, the pedal variance (pedal depth, pedal travel, and pedal stroke) by force A1 is substantially equal to A2. When the pedal variance is A2, the braking force of the braking apparatus substantially shows a predetermined value A3 according to the pedal variance.

When the pedal operation variance is constant, the constant braking force is always generated to satisfy driver request deceleration. The pedal stroke according to a specific pedal effort, and the driver request deceleration and braking force corresponding to the pedal stroke are determined in a specific single mode. Also, variation patterns of the braking force according to pedal effort and the pedal operation variance are determined in a single mode.

Thus, in the related art, since the characteristics of the braking feeling of a vehicle according to pedal effort are not changed in a pre-designed single mode, and pedal effort or braking force characteristics cannot be changed according to driver's tendencies, sufficient braking force may not be achieved by, for example, women or elderly men.

Also, it is difficult to provide a sporty braking feeling to a driver who tends to enjoy sports driving.

The above information disclosed in this Background section is only for enhancement of understanding of the background of the present disclosure and therefore it may contain information that does not form the prior art that is already known in this country to a person of ordinary skill in the art.

SUMMARY

The present disclosure provides a brake control system and method for a vehicle to provide customized braking characteristics for different driving tendencies and ultimately improve vehicle marketability.

An aspect of the present disclosure provides a brake control system having variable braking modes, including: an operation part provided to allow a driver to selectively input one of a plurality of predetermined braking characteristic modes; a brake input detector for detecting a brake pedal operation variance or a brake pedal manipulation force of the driver; and a controller receiving a mode selection signal from the operation part to recognize a braking characteristic mode selected by the driver and then controlling a wheel brake to generate a predetermined pattern of braking force in the braking characteristic mode selected by the driver based on the brake pedal operation variance and the brake pedal operation force detected by the brake input detector.

Another aspect of the present disclosure provides a brake control method having variable braking modes, including: selectively inputting, by a driver, one of a plurality of predetermined braking characteristic modes by operating an operation part; receiving, by a controller, a mode selection signal from the operation part to recognize the braking characteristic mode selected by the driver; and controlling a wheel brake to generate a predetermined pattern of braking force in the braking characteristic mode selected based on a brake pedal operation variance and a brake pedal operation force detected by a brake input detector.

Other aspects and exemplary embodiments of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

Hereinafter reference will now be made in detail to various embodiments of the present disclosure, examples of which are illustrated in the accompanying drawings and described below. It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed hereinafter.

The present disclosure relates to a brake control system and method for a vehicle, which can provide optimal braking force or pedal effort characteristics preferred by a driver. The brake control system and method are configured to achieve braking force or pedal effort (pedal feeling) according to the braking characteristic mode selected by a driver.

Braking input of a driver may be performed by a brake pedal. When a driver selects a braking characteristic mode and manipulates the brake pedal, braking force pattern or pedal feeling may vary according to the selected mode to provide an optimal braking feeling to a driver.

Since the differentiated braking force and pedal effort characteristics can be achieved according to the mode selected, anyone including women or elderly men can easily perform the brake operation and achieve desired braking feeling according to his/her tendencies.

Figure 1:
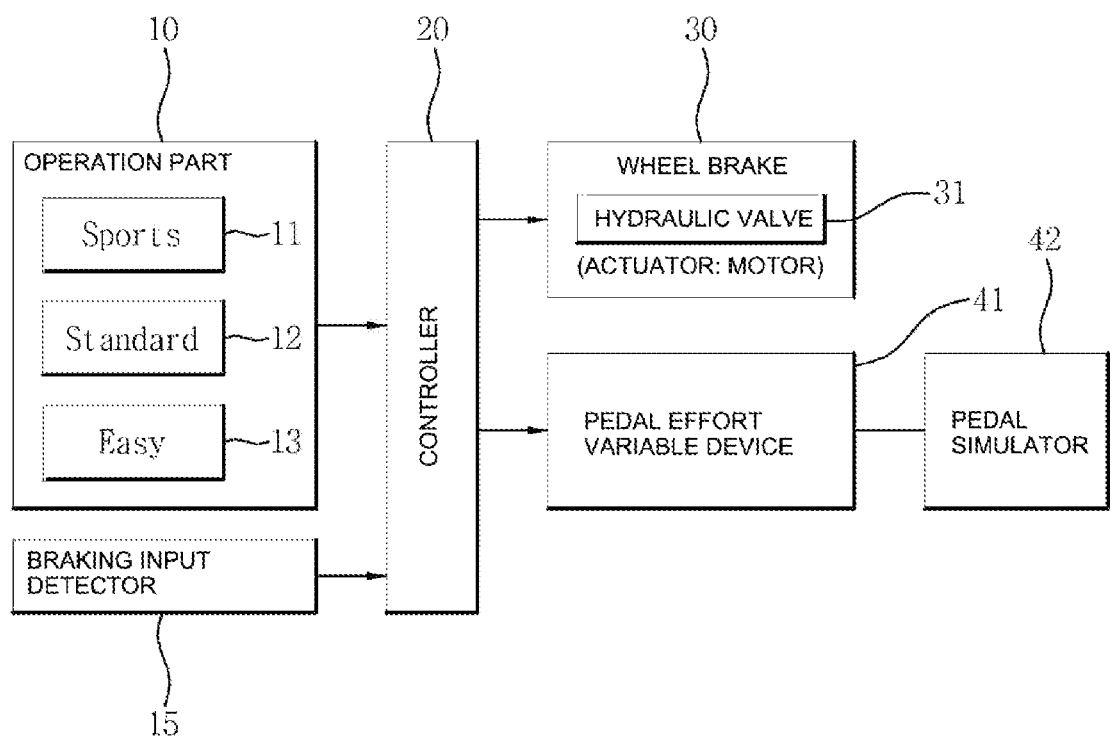
FIG. 1 is a view illustrating a configuration of a braking apparatus including a control system according to an embodiment of the present disclosure.
Figure 2:
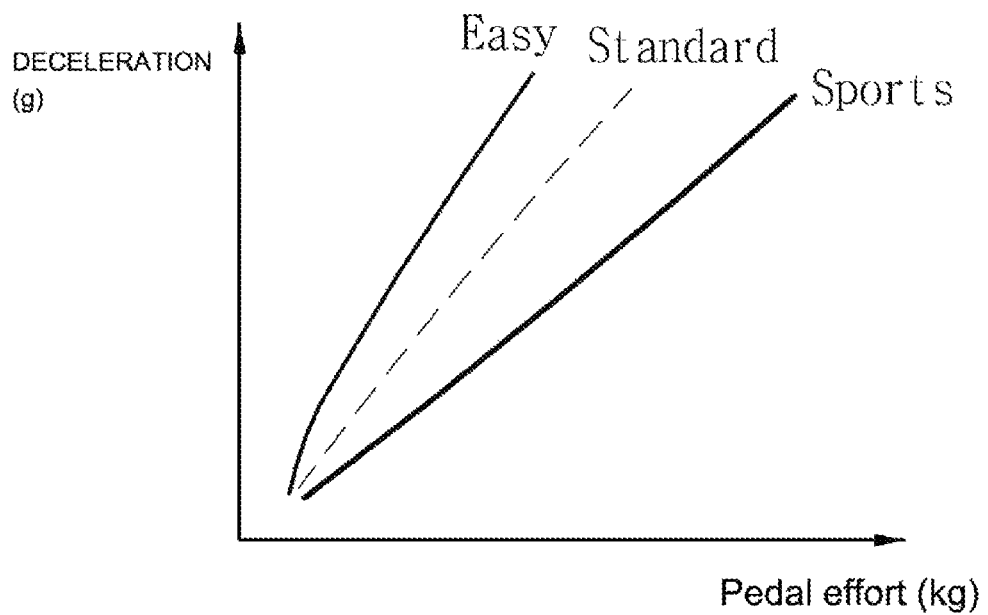
FIG. 2 is a graph illustrating braking characteristics between pedal effort and deceleration according to the driver selection mode in a control method according to an embodiment of the present disclosure.

FIG. 1 is a view illustrating a configuration of a braking apparatus including a control system according to an embodiment of the present disclosure. FIG. 2 is a graph illustrating braking characteristics between pedal effort and deceleration according to the driver selection mode, i.e., the braking characteristic mode selected by a driver in a control method.

A brake control system may include an operation part 10 for a driver to selectively input one of a plurality of predetermined braking characteristic modes. The operation part 10 may be disposed around the driver's seat, such as a center fascia, a cluster, a steering wheel, a multi-functional switch, or a door trim, allowing a driver to easily manipulate the operation part 10.

Figure 3:
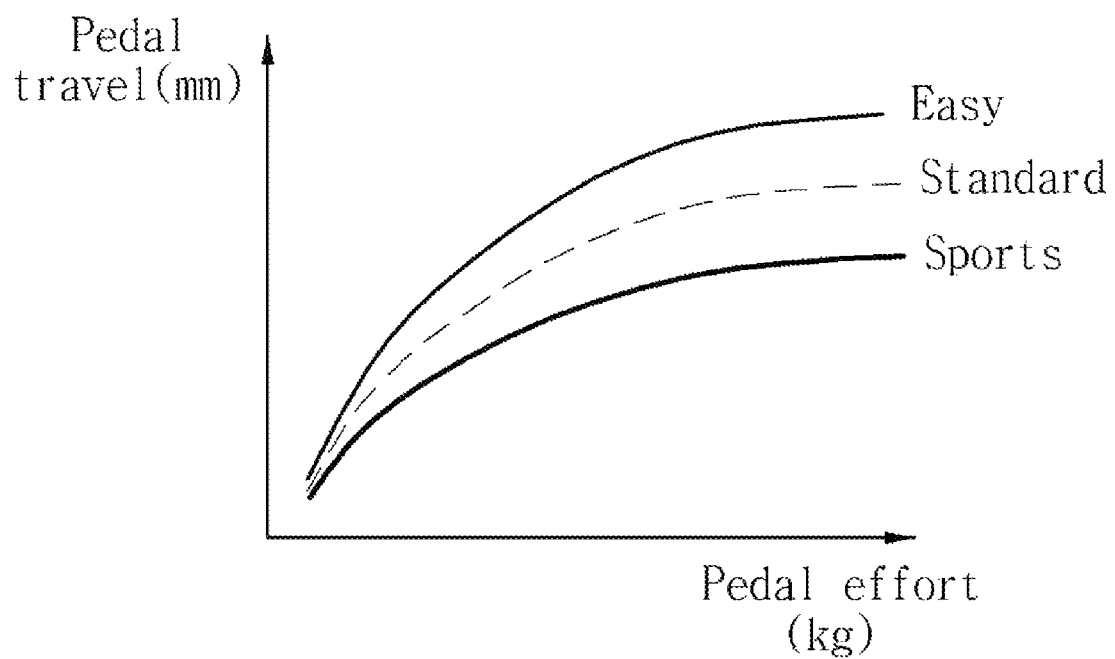
FIG. 3 is a graph illustrating variation of pedal travel according to pedal effort for each mode in a control method according to another embodiment of the present disclosure.

Referring to FIGS. 2 and 3, the braking characteristic mode may be predetermined in a plurality of modes showing different braking force characteristics or pedal effort characteristics by the braking input operation of a driver, i.e., stepping on the brake pedal to stop a vehicle.

As shown in FIG. 1, the operation part 10 may be configured to include a plurality of buttons 11, 12 and 13. Instead of the button type, the operation part 10 may be adapted into operation devices or input devices in a vehicle such as knob, switches, or touchscreen.

When a driver operates the operation part 10 to select a mode, a mode selection signal of the operation part 10 selected by a driver may be applied to a controller 20, and then the controller 20 may recognize the mode selected by a driver.

The brake control system may include a brake input detector 15 for detecting a brake pedal operation variance or a brake pedal operation force by a driver. The brake input detector 15 may include a pedal stroke sensor for detecting a brake pedal stroke (pedal travel) or a pressure sensor for detecting pedal effort (force applied to the brake pedal) by a driver.

The controller 20 may include a typical brake controller to control the operation of the brake apparatus in a vehicle according to the braking input of a driver. Similar to a typical brake apparatus, when a driver operates the brake pedal, the controller 20 may calculate a driver request deceleration through a map based on the brake pedal operation variance (pedal stroke or pedal travel) or brake pedal operation force (pedal effort) detected by the brake input detector 15 and calculate target braking force corresponding to the driver request deceleration, and then may control the generation of braking force of a wheel brake 30 based on the target braking force.

Thus, the generation of the braking force of the wheel brake 30 controlled in accordance with the brake pedal operation variance or the brake pedal operation force does not differ from a related art. However, in this embodiment, when a driver performs the braking input for the mode selected by a driver, the controller 20 may control the braking force characteristics according to the brake pedal operation variance, the brake pedal operation force, or the pedal effort characteristics upon operation of the brake pedal by differentiating between the modes.

FIG. 2 is a view illustrating the braking force characteristics differentiated between modes by a software method, which illustrates the braking force characteristics for each mode. The diagram of pedal effort and driver request deceleration may become an example of a map to calculate the driver request deceleration based on the brake pedal operation variance or the brake pedal operation force of a driver detected by the brake input detector 15.

FIG. 2 shows a map in which the driver request deceleration is differentiated by each mode according to the operation force/pressure, i.e., pedal effort applied by a driver. Since the pedal stroke is determined according to pedal effort, the driver request deceleration according to the pedal stroke may also be similar to the diagram of FIG. 2.

When the driver request deceleration is determined from the deceleration diagram of pedal stroke-driver request deceleration based on the pedal stroke (brake pedal operation variance) detected by the pedal stroke sensor, and a target braking force that can meet the driver request deceleration is calculated, a method of performing brake control to generate the target braking force may also be applied.

Thus, the map in which the driver request deceleration is predefined by the brake pedal operation variance (pedal stroke or pedal travel) or the brake pedal operation force for each mode may be stored in the controller 20 in advance, such that the driver request deceleration for each mode can be calculated based on the brake pedal operation variance or the brake pedal operation force detected and inputted by the brake input detector 15.

FIG. 2 illustrates three braking characteristic modes (easy, standard and sports). The map may be configured such that gradient (change rate) of the driver request deceleration with respect to pedal effort (force applied to the pedal by a driver) can be differentiated between three modes.

Alternatively, the map may be configured such that the magnitude of the driver request deceleration corresponding to the pedal effort is always differentiated between three modes. Here, the pedal effort may be detected by a pressure sensor as the brake input detector 15, but may become a pedal stroke value detected by the pedal stroke sensor instead of the pedal effort.

In easy mode, the change rate of the deceleration with respect to the variation of the pedal effort (pedal stroke) inputted by a driver may be relatively larger than those of other modes, and also, the magnitude of the driver request deceleration corresponding to the same pedal effort may be always larger than those of other modes.

Referring to FIG. 2, in easy mode, although a driver operates the brake pedal with a smaller force than those of other modes, a larger braking force may be generated because the driver request deceleration with respect to the same pedal effort is larger than those of other modes.

The gradient of line in standard mode may be set smaller than that in easy mode, and the gradient of line in sports mode may be set smaller than that in standard mode.

Also, the magnitude of the driver request deceleration with respect to the same pedal effort in standard mode may be always set smaller than that in easy mode, and the magnitude of the driver request deceleration with respect to the same pedal effort in sports mode may be always set smaller than that in standard mode.

The number of the braking characteristic modes can be changed. The numbers of the braking characteristic modes are not limited to three as shown in FIG. 2. Accordingly, more differentiated modes in terms of braking force characteristics may be set.

Referring to FIG. 1, the brake apparatus may include a wheel brake 30 that generates a braking force corresponding to the brake pedal operation variance or the brake pedal operation force by performing hydraulic control (in case of hydraulic brake or EHB) or electric actuator control (in case of EMB) according to the control signals of the controller 20.

Here, the mechanical configuration of the wheel brake 30 may be similar to that of a typical wheel brake. Also, there is no difference in a process of controlling the hydraulic pressure (e.g., controlling the hydraulic pressure of a wheel cylinder/hydraulic caliper) applied to the wheel brake 30 through a hydraulic valve 31 based on the target braking force, or performing the electric actuator control (motor) such that a braking force can be generated in the wheel brake 30 of each wheel according to the brake pedal operation variance or the brake pedal operation force of a driver.

As shown in FIG. 2, the driver request deceleration according to the mode may be calculated from the brake pedal operation variance or the brake pedal operation force (detected by the brake input detector) according to the predetermined braking force characteristics for each mode. Based on the driver request deceleration corresponding to the selected mode, the generation of the braking force of the wheel brake 30 may be controlled. Accordingly, there is a clear difference in that the generated braking force and the braking force characteristics (variation pattern of the braking force according to pedal operation variance or pedal operation force) vary with the mode.

When a driver selects a desired mode, the controller 20 may recognize the selected mode to generate determined braking force for each mode corresponding to the pedal operation variance or the pedal operation force. Particularly, since the wheel brake 30 is controlled to generate different braking forces (hydraulic control or electric actuator control) even though the pedal operation variance or the pedal operation force is equal according to selected modes, differentiated braking force characteristics can be achieved according to the modes.

FIG. 3 is a graph illustrating braking characteristics representing a relation between pedal effort and pedal stroke (travel) according to the driver selection mode, i.e., the braking characteristic mode selected in the control system and method according to another embodiment of the present disclosure, which shows a variation of pedal travel according to pedal effort for each mode.

In the embodiment described with reference to FIG. 2, the controller 20 may vary braking force generated in the wheel brake 30 according to each mode even though the same pedal effort is applied by a driver, so that the braking force characteristics can be differentiated according to the mode selected by a driver.

On the other hand, in another embodiment of FIG. 3, the controller 20 may recognize the braking characteristics mode selected by a driver from a mode selection signal inputted from the operation part 10, and then may vary the pedal effort (pedal feeling) characteristics for each mode instead of the braking force characteristics.

That is, a driver may be allowed to feel different forces applied to the brake pedal through control of hardware factors in a brake pedal unit according to the braking characteristic mode selected by a driver, and the pedal stroke and the variation pattern thereof according to the pedal effort may be controlled to be differentiated according to each mode. Thus, even when same pedal effort is applied, different braking forces may be allowed to generate according to the mode selected.

In this embodiment, the control system may further include a pedal effort variable device 41 of a pedal simulator 42 that adjusts the pedal stroke pattern corresponding to driver's pedal effort according to a control signal outputted from of the controller 20 for each mode. The pedal effort variable device 41 is shown in FIG. 1.

The pedal effort variable device 41 may change the pedal effort characteristics according to the control signal of the controller 20, i.e., the pedal effort-stroke characteristics according to the mode as shown in FIG. 3. The pedal effort variable device 41 may control repulsive force against pedal effort in the pedal simulator 42 determining pedal feeling to vary the pedal stroke shown when a specific pedal effort is applied according to the mode. Thus, the pedal effort variable device 41 may serve as a device that varies the pedal effort to be applied to exert a desired braking force according to the mode.

In order to generate a desired braking force, pedal effort by a driver may be allowed to vary. Also, as shown in FIG. 3, the pedal stroke may be allowed to vary even though same pedal effort is inputted into the pedal simulator 42 according to selected mode.

The pedal effort variable device 41 may have a structure in which the pedal effort varies by changing shearing force of magnetorheological (MR) and electrorheological (ER) fluids by a pedal simulator, a structure in which the fluid flow rate and hydraulic pressure of the pedal simulator vary by changing inlet area of an orifice using a motor control-type orifice, or a structure in which the fluid flow rate and hydraulic pressure of the pedal simulator vary by using a solenoid valve.

When the pedal effort variable device 41 is applied, pedal effort to be applied to exert the same pedal stroke and the braking force may vary by each mode.

Since the pedal stroke corresponding to pedal effort varies with different mode, the pedal stroke for each mode may become different even when a driver applies the same force to the pedal.

When the pedal stroke of the brake pedal unit varies with same force applied, braking force may vary with mode due to a difference between the pedal strokes.

In this case, when the brake input detector 15 detects the pedal stroke and inputs the pedal stroke into the controller 20, the controller 20 may calculate the driver request deceleration corresponding to the detected pedal stroke, and then may calculate a target braking force. Also, the controller 20 may control the wheel brake 30 to generate the target braking force.

Accordingly, since the pedal stroke is detected by the brake input detector 15, i.e., the pedal stroke sensor varies with mode, there may exist a difference in braking force generated when the controller 20 controls the wheel brake 30 based on the information of the pedal stroke sensor.

While the variation pattern of the pedal stroke according to the pedal effort is different between modes in a hardware manner that controls the pedal effort variable device 41 of the pedal simulator 42, the braking force of the wheel brake 30 may vary with mode even though a driver applies the same pedal effort.

Thus, although smaller pedal effort is applied according to the mode, large braking force may be generated. Also, there may be a case where a driver needs to apply a larger pedal effort to generate the same braking force.

FIG. 3 illustrates three braking characteristic modes (easy, standard and sports). As shown in FIG. 3, the pedal stork change rate in the pedal simulator with respect to pedal effort (force applied to the pedal by a driver) can be differentiated between three modes.

Alternatively, a map may be configured such that the magnitude of the pedal stroke corresponding to the pedal effort is always differentiated between three modes. In this case, the pedal stroke may be a value that is adjusted in a hardware manner by the pedal effort variable device 41 of the pedal simulator 42 so as to vary with mode.

In easy mode, the change rate of the pedal stroke with respect to the variation of the pedal effort (pedal stroke) inputted by a driver may be relatively larger than those of other modes, and also, the magnitude of the pedal stroke corresponding to the same pedal effort may be always larger than those of other modes.

Accordingly, in easy mode, although a driver operates the brake pedal with a smaller force than those of other modes, a larger braking force may be generated (because the pedal stroke at the pedal simulator with respect to the same pedal effort is larger than those of other modes).

The gradient of line in standard mode may be set smaller than that in easy mode, and the gradient of line in sports mode may be set smaller than that in standard mode.

Also, the magnitude of the pedal stroke with respect to the same pedal effort in standard mode may be always set smaller than that in easy mode, and the magnitude of the pedal stroke with respect to the same pedal effort in sports mode may be always set smaller than that in standard mode.

The number of the braking characteristic modes can be changed, and the numbers of the braking characteristic modes are not limited to three as shown in FIG. 2. Accordingly, more differentiated modes in terms of braking force characteristics may be set.

Figure 4:
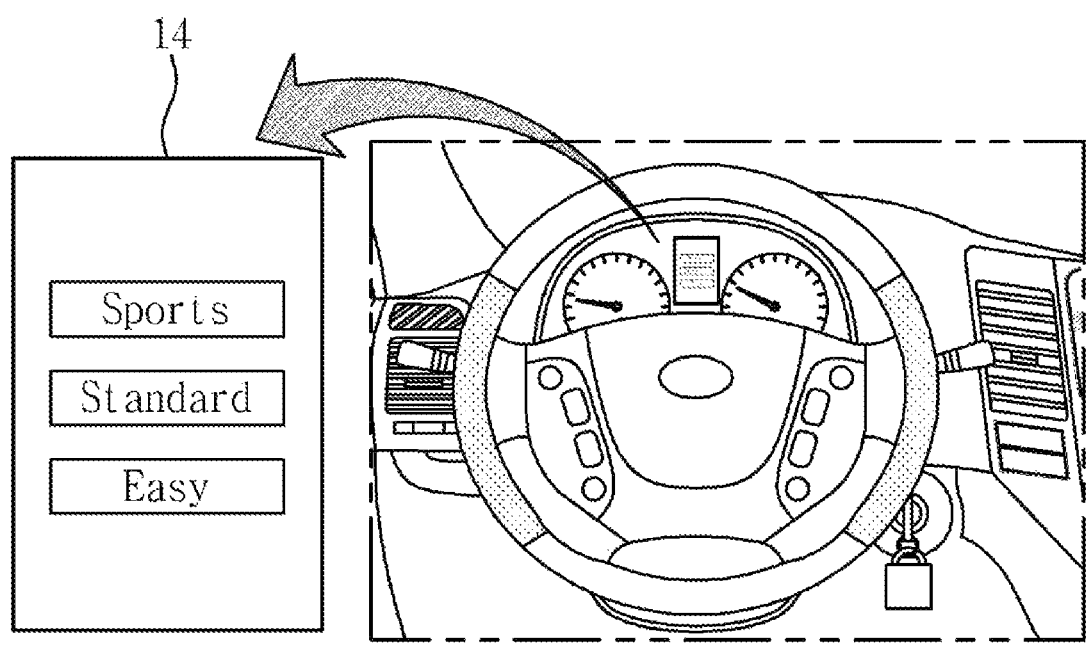
FIG. 4 is a view illustrating a mode display part according to an embodiment of the present disclosure.

FIG. 4 is a view illustrating a mode display 14 for displaying the current braking characteristic mode when a driver operates the operation part. The mode display 14 may be provided in a cluster.

Thus, the braking force of a braking apparatus generated in response to the pedal effort of a driver according to a mode selected by the driver can be differentiated, and customized braking characteristics can be provided to drivers for different tendencies, thereby improving vehicle marketability.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A brake control system having variable braking modes, comprising:
    an operation part provided to allow a driver to selectively input one of a plurality of predetermined braking characteristics modes;
    a brake input detector for detecting a brake pedal operation variance or a brake pedal manipulation force of the driver;
    a controller receiving a mode selection signal from the operation part to recognize a braking characteristic mode selected by the driver, and then controlling a wheel brake to generate a predetermined pattern of braking force in the braking characteristic mode selected by the driver based on the brake pedal operation variance and a brake pedal operation force detected by the brake input detector; and
    a pedal effort variable device adjusting a pedal stroke of a pedal simulator with respect to a driver's pedal effort according to a control signal of the controller,
    wherein the controller receives the mode selection signal from the operation part to recognize the selected braking characteristic mode and controls the pedal effort variable device to vary the pedal stroke of the pedal simulator with respect to the driver's pedal effort according to the selected braking characteristic mode, such that different braking forces are generated according to the selected braking characteristic mode even when a same pedal effort is applied.

2. The brake control system of claim 1, wherein the controller is configured such that a driver request deceleration corresponding to the brake pedal operation variance and the brake pedal operation force varies with the braking characteristic mode.

3. The brake control system of claim 2, wherein the braking characteristic mode is provided in plurality in which a change rate of the driver request deceleration with the respect to the brake pedal operation variance or the brake pedal operation force varies or a magnitude of the driver request deceleration corresponding to the brake pedal operation variance or the brake pedal operation force is always set to vary.

4. The brake control system of claim 1, wherein the braking characteristic mode is provided in plurality in which a change rate of the pedal stroke of the pedal simulator with the respect to the driver's pedal effort varies or a magnitude of the pedal stroke corresponding to the driver's pedal effort is always set to vary.

5. The brake control system of claim 1, further comprising a mode display for displaying the braking characteristics mode selected by the driver.

6. A brake control method having variable braking modes, comprising:
    selectively inputting, by a driver, one of a plurality of predetermined braking characteristic modes by operating an operation part;
    receiving, by a controller, a mode selection signal from the operation part to recognize the braking characteristic mode selected by the driver; and
    controlling a wheel brake to generate a predetermined pattern of braking force in the braking characteristic mode selected by the driver based on a brake pedal operation variance and a brake pedal operation force detected by a brake input detector,
    wherein the controller receives the mode selection signal from the operation part to recognize the selected braking characteristic mode and controls a pedal effort variable device, which adjusts a pedal stroke of a pedal simulator with respect to a driver's pedal effort according to a control signal of the controller, to vary the pedal stroke of the pedal simulator with respect to the driver's pedal effort according to the selected braking characteristic mode, such that different braking forces are generated according to the selected braking characteristic mode even when a same pedal effort is applied.

7. The brake control method of claim 6, wherein the controller is configured such that a driver request deceleration corresponding to the brake pedal operation variance and the brake pedal operation force varies with the braking characteristic mode.

8. The brake control method of claim 7, wherein the braking characteristic mode is provided in plurality in which a change rate of the driver request deceleration with the respect to the brake pedal operation variance or the brake pedal operation force varies or a magnitude of the driver request deceleration corresponding to the brake pedal operation variance or the brake pedal operation force is always set to vary.

9. The brake control method of claim 6, wherein the braking characteristic mode is provided in plurality in which a change rate of the pedal stroke of the pedal simulator with the respect to the driver's pedal effort varies or a magnitude of the pedal stroke corresponding to the driver's pedal effort is always set to vary.

* * * * *